No. 648,191. Patented Apr. 24, 1900.
A. CAPRA.
COIN CONTROLLED STREET PIANO.
(Application filed May 24, 1899.)
(No Model.) 8 Sheets—Sheet 1.

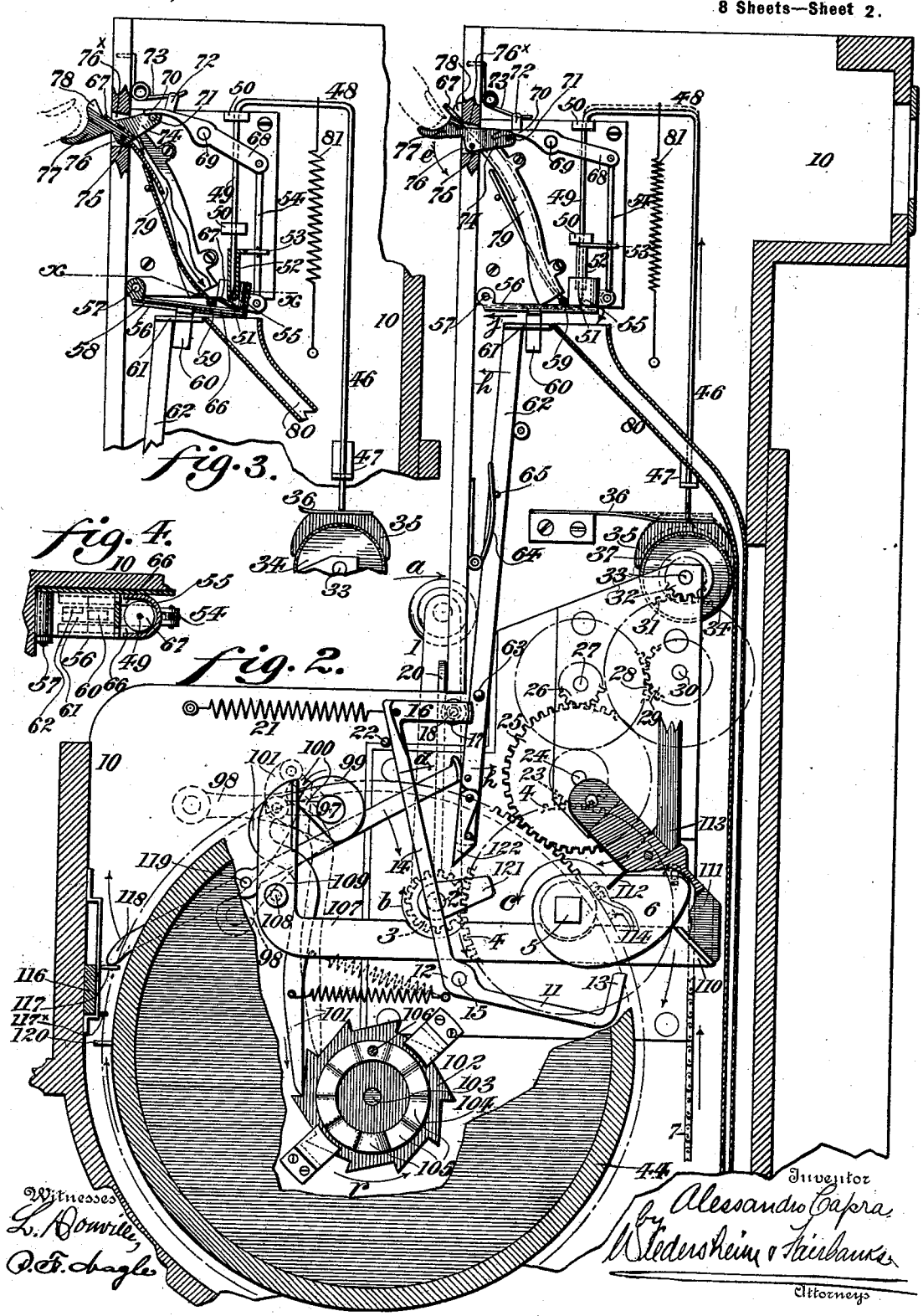

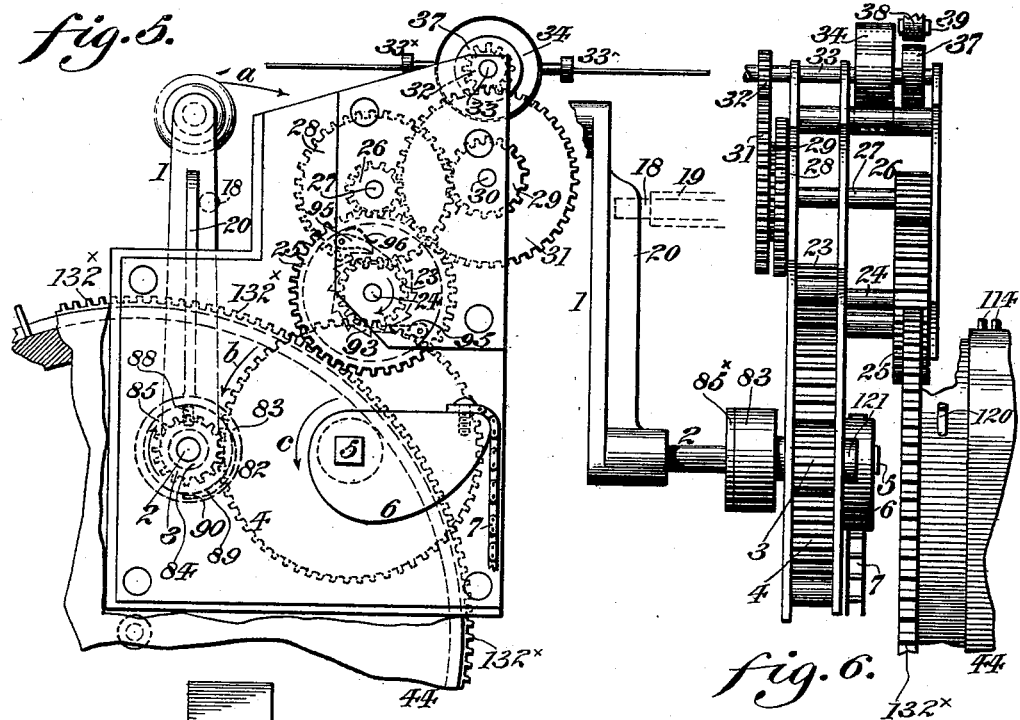

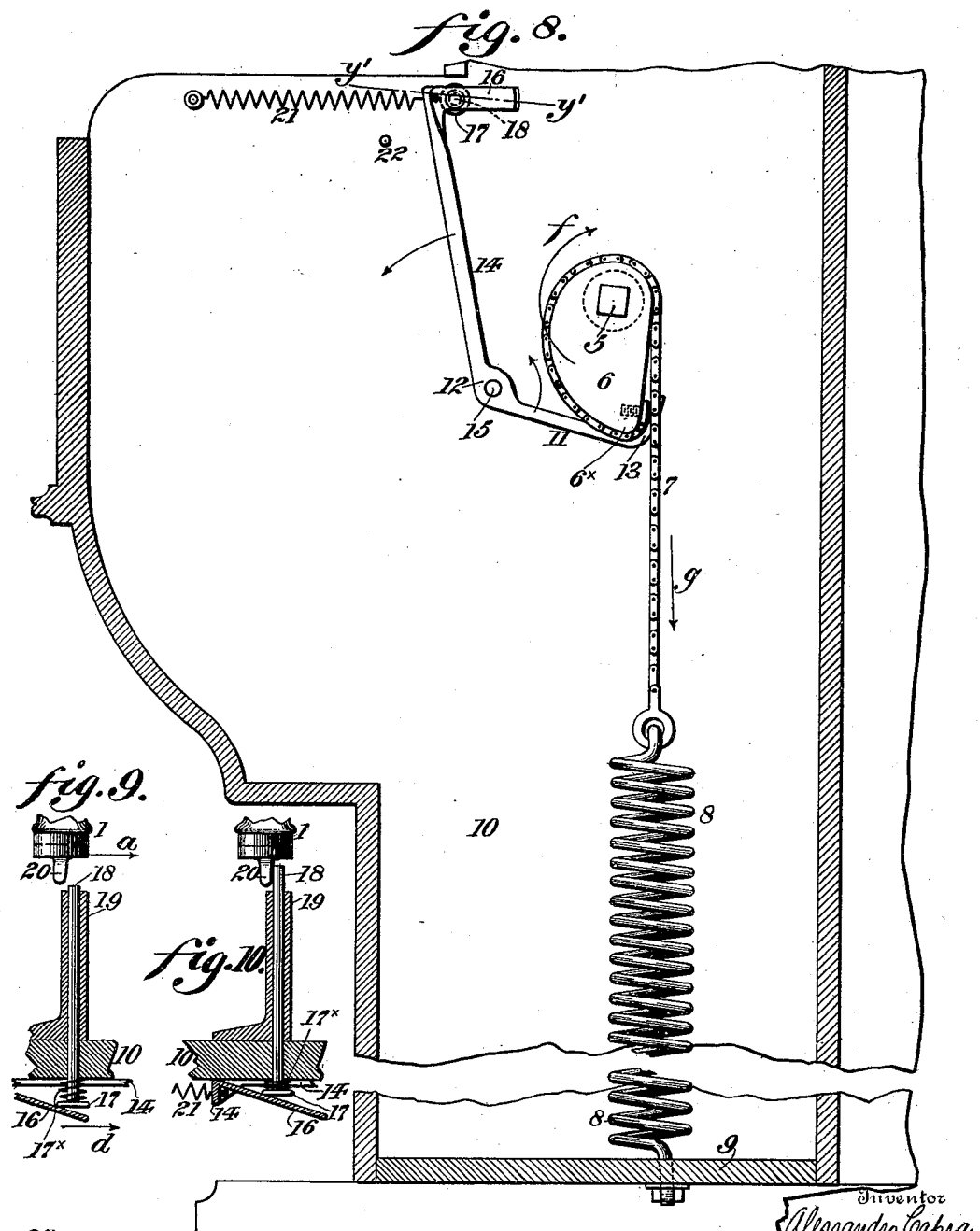

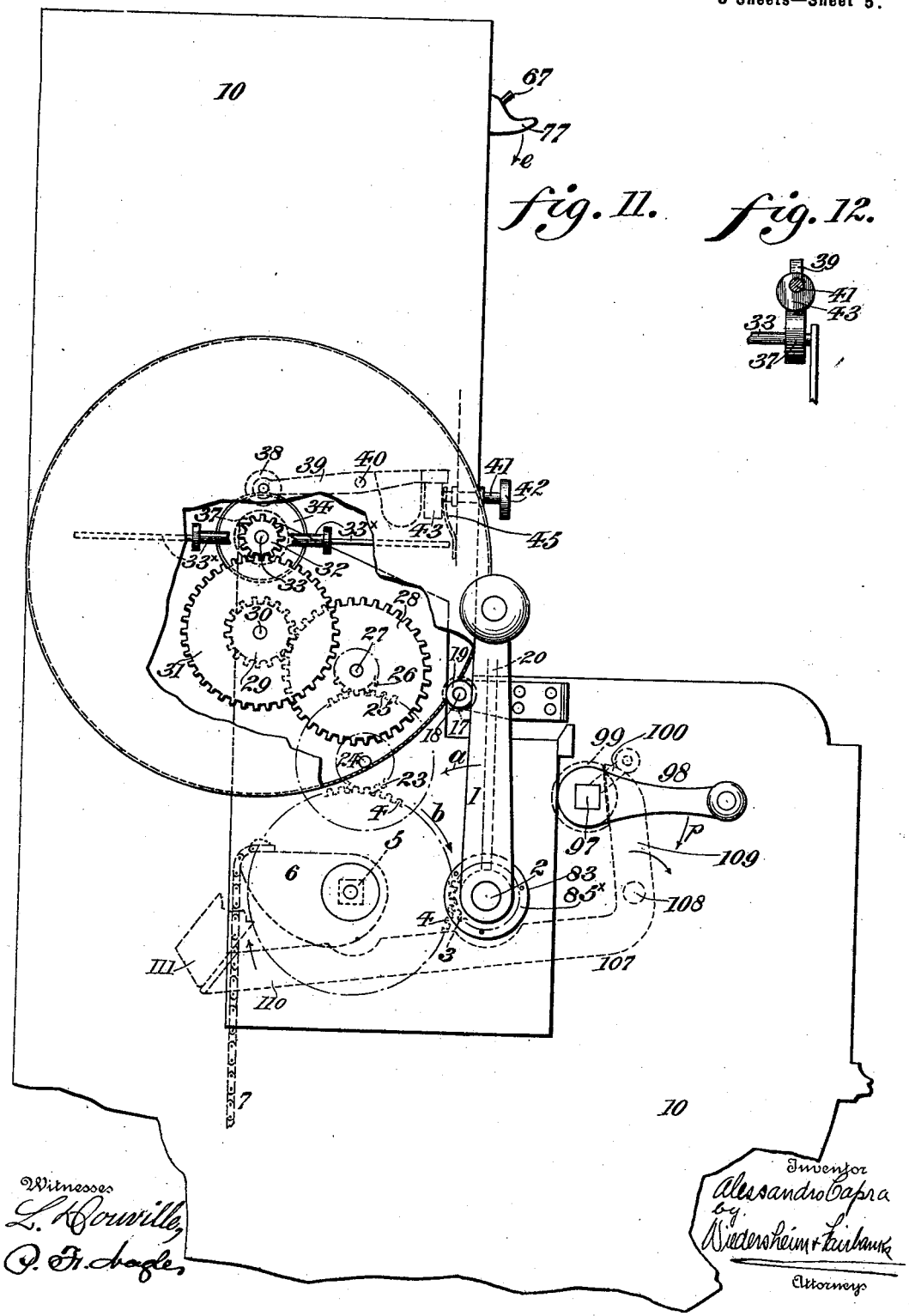

No. 648,191. Patented Apr. 24, 1900.
A. CAPRA.
COIN CONTROLLED STREET PIANO.
(Application filed May 24, 1899.)
(No Model.) 8 Sheets—Sheet 6.
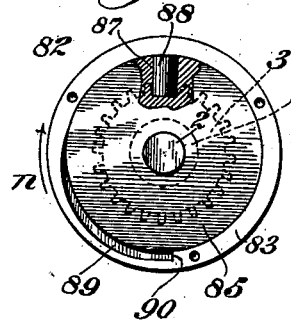
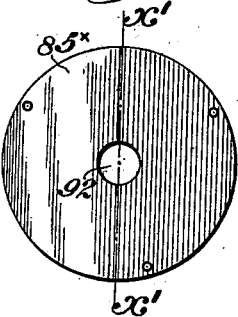
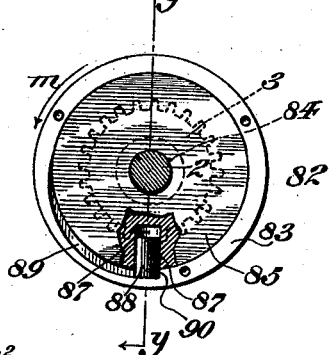
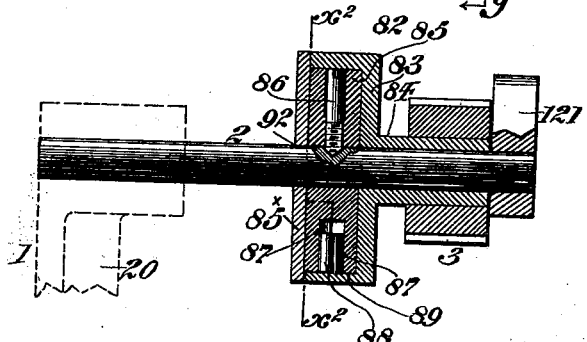
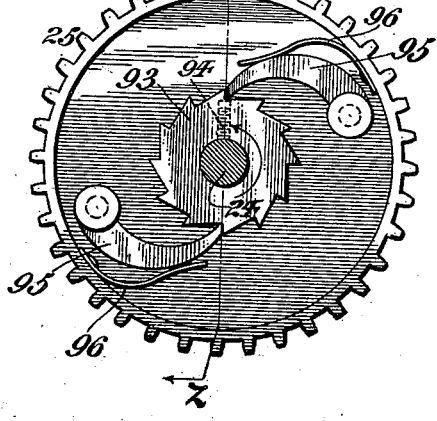
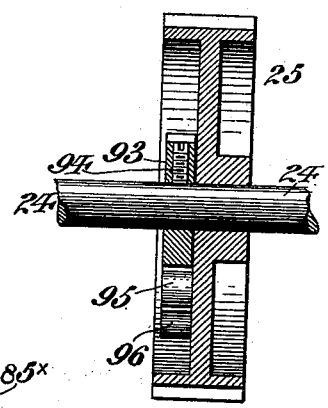

No. 648,191. Patented Apr. 24, 1900.
A. CAPRA.
COIN CONTROLLED STREET PIANO.
(Application filed May 24, 1899.)
(No Model.)
8 Sheets—Sheet 7.

No. 648,191. Patented Apr. 24, 1900.
A. CAPRA.
COIN CONTROLLED STREET PIANO.
(Application filed May 24, 1899.)
(No Model.) 8 Sheets—Sheet 8.
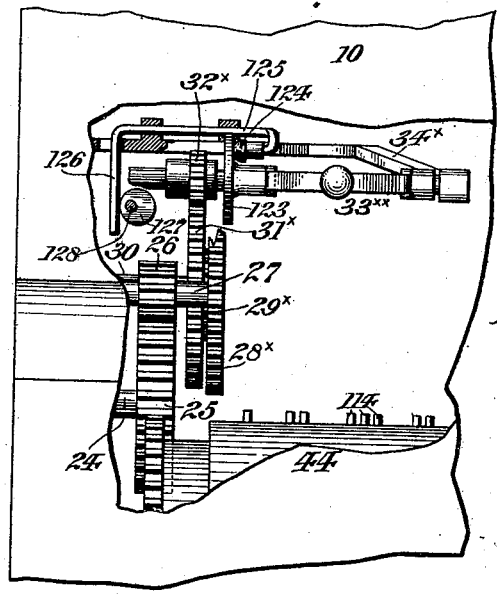
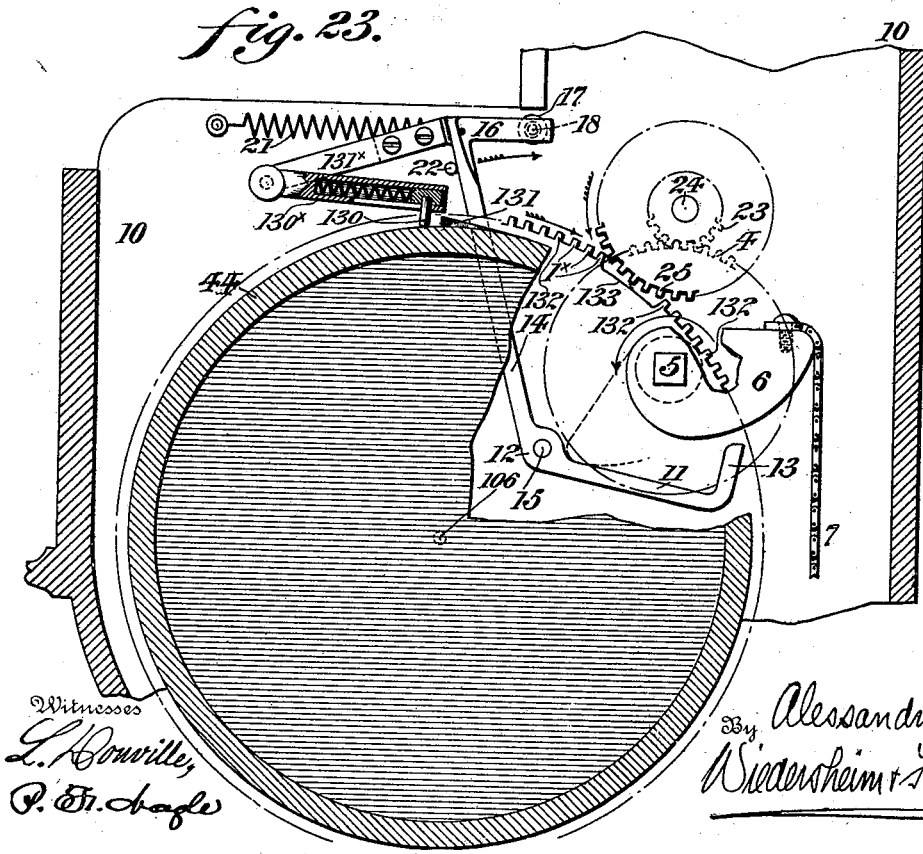

UNITED STATES PATENT OFFICE.

ALESSANDRO CAPRA, OF PHILADELPHIA, PENNSYLVANIA.

COIN-CONTROLLED STREET-PIANO.

SPECIFICATION forming part of Letters Patent No. 648,191, dated April 24, 1900.

Application filed May 24, 1899. Serial No. 718,079. (No model.)

*To all whom it may concern:*

Be it known that I, ALESSANDRO CAPRA, a subject of the King of Italy, residing in the city and county of Philadelphia, State of Pennsylvania, have invented a new and useful Improvement in Coin-Controlled Street-Pianos, which improvement is fully set forth in the following specification and accompanying drawings.

My invention relates to coin-controlled street-pianos; and it consists of improvements of the same in various details, as will be hereinafter set forth.

It also consists of means for detecting and arresting any pieces of cardboard, soft disks, or similar material which may be inserted into the machine for the purpose of fraudulently operating the same.

It further consists of novel details of construction, all as will be hereinafter fully set forth, and particularly pointed out in the claims.

Figures 1, 20:
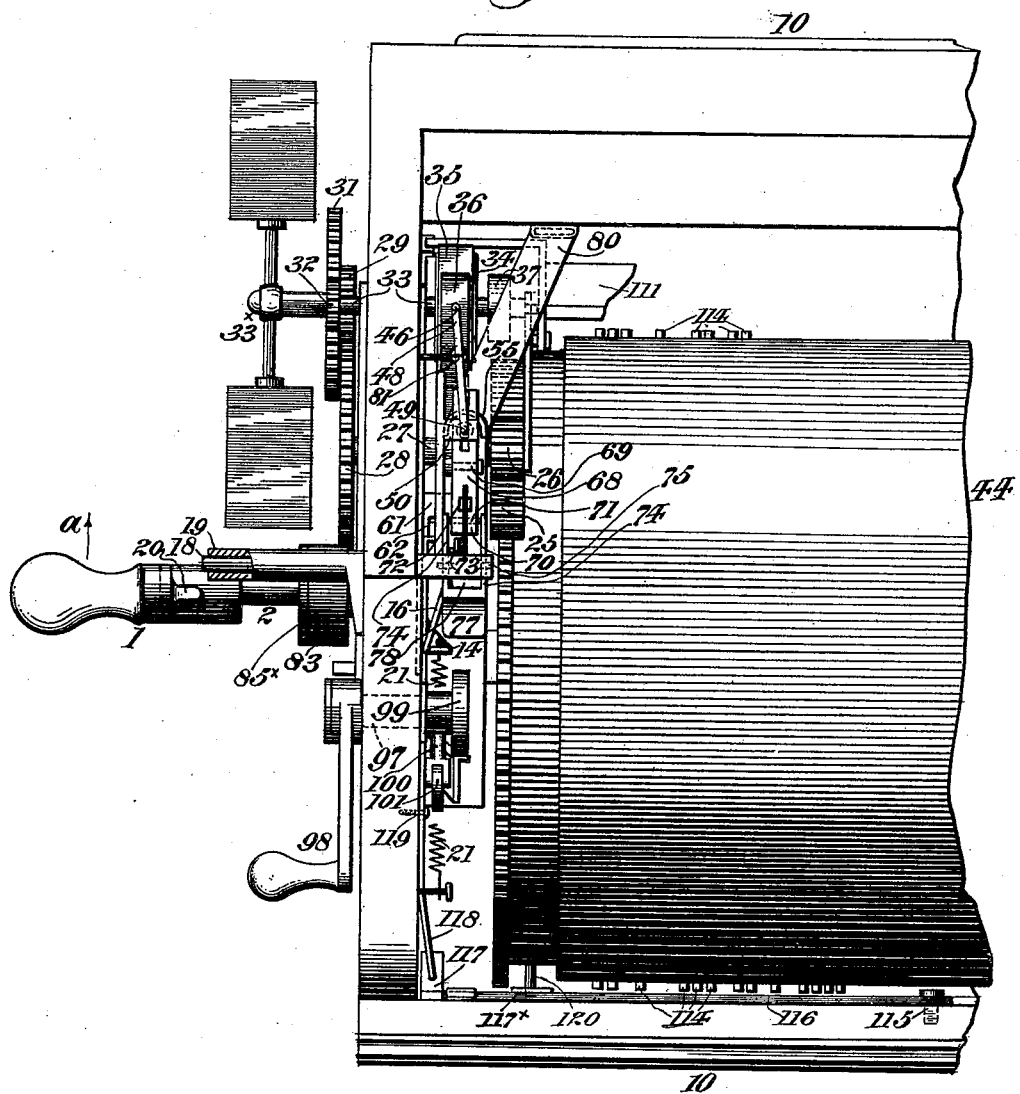
Figure 21:
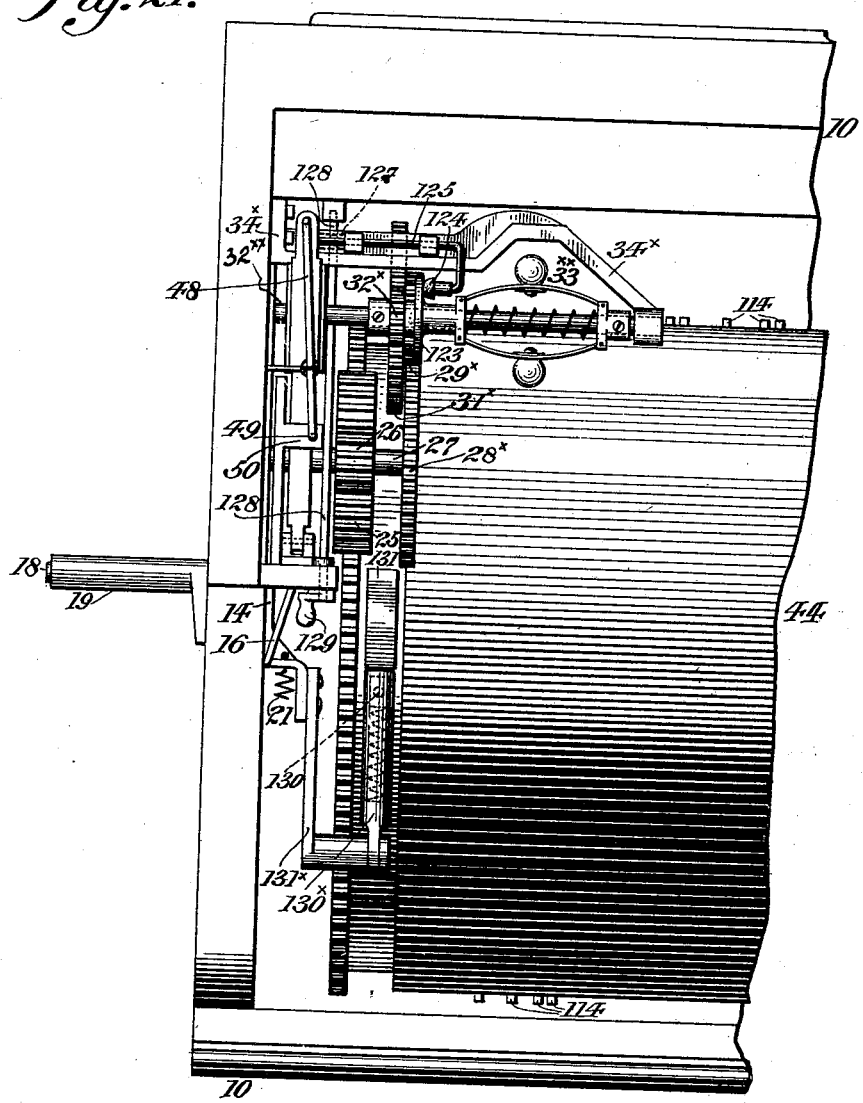

Figure 1 represents a plan view of a coin-controlled street-piano embodying my invention. Fig. 2 represents a vertical sectional view of Fig. 1, certain of the parts being shown in elevation, the upper portion of the machine being shown in its normal position. Fig. 3 represents a view similar to the upper portion of Fig. 2, but showing the position the parts assume after the coin has been inserted. Fig. 4 represents a section on line $x\ x$, Fig. 3, showing the means for supporting and releasing the coin. Fig. 5 represents a detached view showing the train of gearing or clockwork which is actuated by the winding of the apparatus, showing also the governing device and the drum to which the brake-shoe is adapted to be applied. Fig. 6 represents a side elevation of Fig. 5. Fig. 7 represents a plan view of Fig. 6. Fig. 8 represents a side elevation of the device for initially winding up the piano, showing also in elevation the means for stopping the winding at the desired point. Fig. 9 represents a detached sectional view showing the upper portion of the bell-crank or lever and a bolt or stop actuated thereby. Fig. 10 represents a section on line $y'\ y'$, Fig. 8. Fig. 11 represents a front elevation of the means for limiting the winding apparatus, showing also a side elevation of the means for regulating or controlling its speed. Fig. 12 represents a view, partly in section, of a portion of Fig. 11 to be hereinafter referred to. Fig. 13 represents an end elevation, partly broken away, of a portion of Fig. 16, the lid or cover of the housing seen therein being removed. Fig. 14 represents a side elevation of the cover of the housing seen in Fig. 16. Fig. 15 represents a section on line $x^2\ x^2$, Fig. 16. Fig. 16 represents a section on line $y\ y$, Fig. 15, certain of the parts being shown in elevation. Fig. 17 represents, on an enlarged scale, a side elevation of an intermediate gear and the pawl-and-ratchet mechanism carried thereby, the relative position of said gear and its adjuncts when assembled being seen in Fig. 5. Fig. 18 represents a section on line $z\ z$, Fig. 17. Fig. 19 represents a section on line $x'\ x'$, Fig. 14. Fig. 20 represents a perspective view of a ratchet wheel or device for permitting changing of the tunes, the same being seen in side elevation in Fig. 2. Fig. 21 represents a plan view of the apparatus similar to that seen in Fig. 1, but showing a modified construction of governing device wherein the governor is located within the piano-casing. Fig. 22 represents an elevation of certain of the parts seen in Fig. 21 and showing the position into which the parts have been moved by the governor in case of improper or too-rapid rotation of the same. Fig. 23 represents a side elevation, partly in section, of a portion of the stop apparatus and its adjuncts to be hereinafter referred to.

Similar numerals of reference indicate corresponding parts in the figures.

Referring to the drawings, in order to operate the piano the same must first be wound, which is done by rotating the crank or handle 1, which is mounted on the shaft 2, which carries the pinion 3 in mesh with the gear 4, which is mounted on the shaft 5, which has the cam 6 secured thereto, so as to rotate in unison therewith, the preferred manner of mounting the gear 3 being understood from Fig. 16, as will be explained.

7 designates a chain or other connection which has one end attached to the cam 6 at a point eccentric to the shaft 5, the other end of said chain being secured to an end of the spring 8, the lower extremity of the latter being fastened to the base 9 of the casing 10. The cam 6 is so located and constructed that when it is rotated a portion thereof will contact with the arm 11 of the bell-crank or lever 12, said arm having an offset portion 13. The bell-crank is fulcrumed at 15 and provided with the arm 14, which extends upwardly in the present instance and is provided with the lateral or substantially horizontally extending member 16, which is deflected at an angle to the arm 14, as will be understood from Fig. 10. The member 16 is normally located with respect to the head 17 of the bolt 18 as seen in Fig. 9, said bolt passing through the casing 10 and the bearing 19, secured thereto. When the cam 6 has turned into the position seen in Fig. 8, the bell-crank 12 will be rocked into the position seen in Figs. 8 and 10, whereupon the end of the bolt 18 will be forced outwardly into the path of the rib or abutment 20, which is attached to the handle 1, whereby the extent of rotation thereof will be positively checked, this action taking place as soon as the desired tension has been put on the spring 8.

21 designates a spring by means of which the bell-crank 13 is held in its normal position, the same abutting against the pin 22 prior to the operation of winding, as will be understood from Fig. 2.

By the act of winding of the apparatus, as above described, rotation will be imparted from the gear 4 to the pinion 23, mounted on the shaft 24, which carries the gear 25, the latter meshing with the pinion 26, mounted on the shaft 27, carrying the gear 28, which meshes with the pinion 29, mounted on the shaft 30, which carries the gear 31, which meshes with the pinion 32, mounted on the shaft 33, which latter carries the fan 33× and the drum 34, to which the brake-shoe 35 is applicable, the latter being supported on the strip 36.

37 designates a drum also mounted on the shaft 33, adjacent to which is located the roller 38, which is journaled in the lever 39, the latter being fulcrumed at the point 40, as will be best understood from Fig. 11.

41 designates a rod or stem which is journaled in the casing 10 and has a head or finger-piece 42 for manipulation, said stem having on the inner portion thereof the cam 43, which normally appears as seen in Fig. 11, the roller 38 being out of contact with the drum 37. When, however, it is desired to retard the rotation of the drum 37, and consequently of the cylinder 44, which latter is actuated by a rack or gearing in mesh with the gear 25, as will be understood from Fig. 2, the head 42 is turned so as to enable the cam 43 to contact with the lever 39, and thus cause the roller 38 to contact with the drum 37, said cam being held in contact with said lever and prevented from backward or improper rotation by means of the spring 45, as is evident.

Referring now to Fig. 2, 46 designates a rod which moves in a suitable guide 47, the lower extremity of said rod being attached to the strip 36, which supports the shoe 35, the upper extremity of said rod having the deflected member 48 and having the downwardly-turned member 49, which passes through the guides 50, the lower extremity of said rod being pointed, as at 51, and passing through the sleeve 52, which is supported by an arm 53 upon the link 54, said arm and link moving in unison. The lower extremity of the link 54 is pivotally attached to the shell or housing 55, which is secured to the plate 56, which latter is pivoted at 57 to any suitable point. The plate 56 is provided with suitable guides or ways 58, in which the slide 59 reciprocates, the latter having a lug 60 depending therefrom, which engages the slotted portion 61 of the bar or lever 62, which is fulcrumed at 63 and normally held in the position seen in Fig. 2 by means of a spring 64, which bears upon the pin 65, although it will of course be apparent that other similar means may be employed for holding the lever 62 in proper position. The slide 59 is provided with bifurcations 66, as will be understood from Fig. 4, upon which the coin 67 is adapted to be supported. The upper end of the link 54 is attached to the lever 68, which is fulcrumed at 69 and has the end 70 bearing upon the pin 71, said end 70 being provided with a lug 72, upon which bears the free end of the spring 73, whereby said end 70 is always in contact with the pin 71, the latter being carried on the member 74, which is pivoted at the point 75 in the slot 76. The member 74 has the finger-piece 77 attached thereto, the latter being recessed, as indicated at 78, for the reception of the coin 67.

79 designates a chute or passage-way into which the coin falls after leaving the slotted finger-piece 77, said coin finally passing into the conduit 80.

81 designates a spring connected to the member 48 of the rod 46 for the purpose of holding the shoe 35 normally in contact with the drum 34.

In a device of this character when the winding is effected by means of an external crank or handle or similar device 1 it is essential that there shall be no rotation of said handle to any great extent during unwinding of the machine, since the hands or fingers of the operator or bystanders are liable to be cut or seriously crushed thereby, and in order that the extent of rotation of the handle 1 may be reduced to a minimum I provide the device 82, (seen in Figs. 13 to 16, inclusive,) the same consisting of a casing or housing 83, which has the extension 84 mounted on the shaft 2, as will be best understood from Fig. 16, the pinion 3 being preferably mounted upon said extension.

85 designates a disk which is secured to the shaft 2, so as to rotate in unison therewith, by means of the pin 86 or similar means, said disk being provided with a seat 87, in which the movable plug 88 is located.

89 designates a recess in the wall of the housing 83, said recess being located eccentrically to the shaft or axis 2, wherefrom it will be seen that when the shaft 2 is rotated in the direction of the arrow seen in Fig. 15 the disk 85 will be immediately rotated in unison therewith; but rotation will not be imparted to the housing 83, the extension 84, the gear 3, and the clockwork actuated thereby until the plug or pin 88 has reached the position seen in Figs. 15 and 16, at which point it will drop by gravity and engage the shoulder 90 of the housing, and thus impart rotation thereto and to the pinion 3 and its adjuncts. It will thus be apparent from the foregoing that, the piano being wound up, during the act of playing or unwinding of the apparatus the gear 3 (seen in Fig. 16) and the housing 83 can rotate to the desired extent without necessitating any extended rotation of the shaft 2 or the handle 1. The housing 83 is closed by means of the cover $85^\times$, which has an opening 92 therein, whereby it can be slipped upon the shaft 2 and held in position on said housing by any suitable fastening devices.

In Figs. 17 and 18 I have shown, on an enlarged scale, the gear 25 and the shaft 24 (seen in Fig. 5) and also the pawl-and-ratchet mechanism carried by said gear, the construction being as follows: The gear 25 is mounted loosely on the shaft 24 and has a ratchet-wheel 93 attached thereto by means of a set-screw 94 or other similar device. The teeth of the ratchet-wheel 93 are adapted to be engaged by the pawls 95, which are pivotally mounted upon the gear and are held in position on the ratchet-wheel by means of springs 96, wherefrom it will be evident by following out the directions of rotation that when the apparatus seen in Figs. 5 to 7, inclusive, is wound no rotation is imparted to the shaft 24 and gears 25, 26, 28, 29, 31, and 32.

97 designates a shaft journaled in the casing 10 and having secured thereto a handle 98, a cam 99, and an arm 100, which latter has pivoted thereto a dog 101, which engages the teeth of a ratchet-wheel 102, secured to a shaft 103, journaled in the casing 10, and for the purpose of changing from one tune to another, as will be hereinafter described. The ratchet-wheel 102 is provided with a ring 104, whose working face is formed with steps 105, against one or the other of which abuts the journal 106 on one end of the cylinder 44, as best seen in Fig. 2 and for a purpose to be hereinafter described.

107 designates a bell-crank lever fulcrumed, as at 108, to a suitable fixed point, the upright member 109 of which abuts against the cam 99, while the outer extremity of its horizontal member 110 supports a portion of the key-bar 111, so that the pins 112 of the hammers 113 may be thrown out of the path of the pins 114 on the cylinder 44 when the latter is shifted to produce a change in the tune.

Pivoted to the casing 10, as at 115, (see Fig. 1,) is a lever 116, whose free end is provided with a laterally-projecting strip 117, (see Figs. 1 and 2,) which supports one end of a lever 118, pivoted to the casing 10, as at 119, the opposite end of said lever 118 abutting against the lever 62, so as to operate the latter, for a purpose to be hereinafter described.

The cylinder 44 is provided with a pin 120, which at certain times contacts with the lever 116, so as to lift its free end, and consequently the strip 117 secured thereto, thus operating the lever 118, so that the same may depress that portion of the lever 118 which bears against the lever 62, and thereby operate the same, as hereinafter explained.

The shaft 2 has firmly secured thereto an arm 121, which is brought in contact with the pivoted member 122 of the lever 62, so that when the instrument is being wound said arm 121 when in contact with the member 122 will operate the lever 62, for a purpose to be hereinafter described.

In Figs. 21 and 22 the gearing bearing the numerals of reference $28^\times$, $29^\times$, $31^\times$, and $32^\times$ corresponds to the gearing bearing the numerals of reference 28, 29, 31, and 32 in the other figures, the only difference between them being that the former of these are located within the casing 10, while the latter are exterior thereto.

Referring now to Figs. 21 and 22, $33^{\times\times}$ designates a governor supported in a bracket $34^\times$ and provided with a disk 123, against which abuts the head 124 of a rod 125, which latter has a portion 126 in contact with a cam 127, secured to a shaft 128, journaled in the casing 10 and provided with a handle 129 on the outside of the casing 10, so that said shaft 128 may be rotated by the handle 129, for a purpose to be hereinafter described.

Referring now to Figs. 21 and 23, when the winding of the instrument is accomplished the arm 14 will be in a position corresponding to that seen in Fig. 8. This will cause the pin 130 to abut against the tooth 131 on the cylinder 44 and rotate the latter sufficiently to bring the teeth $1^\times$ thereon in engagement with the teeth of the gear-wheel 25, so that the cylinder 44 will be rotated by said gear-wheel 25 in order to play a tune, it being noted that the pin 130 receives motion from the arm 14 by means of the sleeve $130^\times$, pivoted to the projecting member $131^\times$ of said arm 14.

The gear 132 of the cylinder 44 is mutilated, as at 133, it being apparent that by this means when said mutilated portion is in the position seen in Fig. 23 relatively to the gear-wheel 25 the cylinder 44 receives no motion from said gear-wheel 25 and must consequently come to a stop, which takes place when a tune is ended.

The operation is as follows: The handle 1 is rotated in the direction indicated by the arrow $a$ in Figs. 1, 2, 5, 9, and 11, and this will cause the pinion 3 to rotate in a similar direction, and since the latter meshes with the gear-wheel 4 the latter will be caused to rotate in the direction indicated by the arrows $b$ in said figures, and consequently the cam 6, which is secured to the shaft 5, likewise rotates in the direction indicated by the arrow $b$ and exerts a pull upon the chain 7, causing the latter to expand the spring 8, which produces the motive power. When the cam 6 has traveled sufficiently in the direction indicated by the arrow $c$ in Figs. 2 and 5, it will assume the position seen in Fig. 8, and thus cause the portion $6^\times$ of said cam 6 to contact with the member 11 of the lever 12 and depress said member 11, as seen in Fig. 8. It will be apparent that when the member 11 of the lever 12 is in the position seen in Fig. 8 the member 14 of said lever will be in the position seen in Figs. 8 and 10, it having traveled in the direction indicated by the arrow $d$ in Figs. 2 and 9. It is to be noted that when the lever 12 is in the position seen in Figs. 8 and 10 the member 16 has caused the bolt 18 to move outwardly, thereby bringing its forward end in the path of the rib 20 on the handle 1, thus preventing further rotation of said handle 1, thereby removing any possibility of injury to the mechanism which would otherwise occur from an undue amount of winding, as will be seen from Figs. 6 and 7. A coin 67 is then inserted in the recess 78 of the finger-piece 77, as best seen in Fig. 2, after which said finger-piece 77 is depressed in the direction indicated by the arrow $e$ in Figs. 2 and 11. This will cause the finger-piece 77 to assume the position seen in Fig. 3, and it is to be noted that the pin 71 has raised the end 70 of the lever 68, thereby depressing its opposite end, and consequently the link 54, the sleeve 52, and the shell or housing 55, as likewise the free end of the plate 56, thereby producing a space between the under side of the sleeve 52 and the upper face of the bifurcations 66, and into which space enters the coin 67 after passing through the throat portion $76^\times$ of the slot 76, it being apparent that the said coin will be retained in position on the bifurcations 66 by the housing 55 and that when the finger-piece 77 is in the position seen in Fig. 2 (its normal position) the throat portion $76^\times$ is closed thereby and the coin in the recess 78 cannot enter the chute 79 until said finger-piece is moved into the position seen in Fig. 3. When the finger-piece 77 is released and permitted to move from the position seen in Fig. 3 to its normal position, as seen in Fig. 2, it will be apparent that the spring 73 will restore the lever 68 and its adjuncts to their normal positions, as seen in Fig. 2. When a coin lies between the bifurcations 66 and sleeve 52 when said parts are in their normal positions, it will be evident that the downwardly-turned member 49 of the rod 46, as also the latter, will be raised a distance equal to that of the thickness of the coin 67, thereby removing the brake-shoe 35 from contact with the drum 34, thus permitting the spring 8 to exert its contractile power and drive the mechanism hereinbefore described. Should a cardboard or other wad be inserted in the chute 79 instead of a coin, said wad will not cause the instrument to play a tune, because the point 51 will penetrate the wad when the plate 56 is in the position seen in Fig. 2. In case a second wad should be inserted in the chute 79 it will be apparent that when the finger-piece 77 and its adjuncts are in the positions seen in Fig. 3 the sleeve 52 will strip the wad first inserted in the chute 79 from the member 49 of the rod 46, which will then slide down the conduit 80 and into a receptacle for the coins (not shown) located within the casing 10.

The means employed for removing the bifurcations 66 from beneath the coins (and likewise the wads, should the latter be inserted in the chute 79) is as follows: When the spring 8 is contracting after the removal of the brake-shoe 35 from the drum 34, the cam 6 will be caused to rotate in the direction indicated by the arrow $f$ in Fig. 8, due to the pull upon the chain 7 (in the direction indicated by the arrow $g$) by the contraction of said spring 8. The rotation of the cam 6 in the direction indicated by the arrow $f$ will transmit a rotary motion to the gear-wheel 4 by means of the shaft 5, but in a direction opposite to that indicated by the arrow $b$ in Figs. 5 and 11, it being apparent that the motion of the gear-wheel 4 will be transmitted to the pinion 23, with which it meshes, and consequently to the shaft 24 and ratchet-wheel 93, secured thereto, it being also noted that the rotation of the ratchet-wheel 93 will carry with it the pawls 95, and consequently the gear-wheel 25, which, meshing with the gear $132^\times$, (seen in Figs. 5, 6, and 7,) will transmit a rotary motion to the cylinder 44, with which said gear $132^\times$ is connected, and cause the required series of pins 114 on said cylinder 44 to engage the pins 112, which project from the hammers 113, pivoted in the key-bar 111, and thus play a tune. When the cylinder 44 has made a complete revolution, the pin 120 is brought in contact with the strip $117^\times$ (see Figs. 1 and 2) and lifts the free end of the lever 116, thus causing the same to rock the lever 62 in the direction indicated by the arrows $h$ in Fig. 2, and thereby cause the bifurcations 66 to travel in the direction indicated by the arrow $j$ in Fig. 2 and remove said bifurcations from beneath the coin 67, as likewise a wad, should the latter be in the shell 55, so that said coin and wad, being no longer supported by the bifurcations 66, must necessarily drop into the conduit 80 and be directed by the latter into a receptacle therefor. When the pin 120 has passed the strip $117^\times$, the lever 116 returns by gravity to its normal position, thus permitting the lever 62 to move in a direction opposite to that indicated by the arrows $h$ in Fig. 2, thereby causing the bifurcations 66 to again occupy a position beneath a coin. The spring 81 will then exert a downward pull upon the rod 46 and cause the same to again apply the brake-shoe 35 to the drum 34 and prevent rotation of the several gear-wheels, hereinbefore described, after again winding the instrument. When the cam 6 has been moved from the position seen in Fig. 8 to that seen in Figs. 2 and 5, the spring 21 will restore the lever 12 to its normal position and move the member 16 of said lever from the position seen in Figs. 8 and 10 to that seen in Figs. 2 and 9, thus permitting the spring 17× to restore the bolt 18 to its normal position, as seen in Fig. 9, so as to remove its forward end from the path of the rib 20 of the handle 1, and thus permit the latter to be rotated in order to again wind the instrument.

Should one or more coins be passed through the throat 76× before the winding of the instrument is accomplished, said coins will not cause the instrument to play a tune, as the arm 121 will be brought in contact with the member 122 of the lever 62 during the winding of the instrument and will cause said lever 62 to move in the direction indicated by the arrows $h$ in Fig. 2, thereby removing the bifurcations 66 from beneath said coins, as hereinbefore described, and causing the same to drop down the conduit 80.

The device 82 (seen in Figs. 13 and 15) is viewed in a direction opposite to that in Fig. 5. Consequently the recess 89 in said Figs. 13 and 15 will be to the left of the shoulder 90, while in Fig. 5 said recess 89 is to the right of said shoulder 90.

As hereinbefore stated, when the winding is being accomplished the handle 1 is rotated in the direction indicated by the arrow $a$ in Fig. 5 and causes the disk 85 to rotate in a similar direction by reason of the pin 88 and shoulder 90, against which it at times abuts. In Fig. 15, however, the disk 85 will rotate in the direction indicated by the arrow $m$ when the winding of the instrument is being accomplished. The reason for the pointing in opposite directions of the arrows $a$ and $m$ is that the views of the device 82 (seen in Figs. 5 and 15) are in opposite directions, Fig. 5 being a rear view and Fig. 15 a front view.

When the instrument is unwinding, the housing rotates in the direction indicated by the arrow $n$ in Fig. 13, but does not carry with it the disk 85, because the pin 88 is out of the path of the shoulder 90. When the winding is finished, the pin 88 is in the positions seen in Figs. 5 and 13. The rotation of the shaft 32×× (seen in Figs. 21 and 22) will cause the weights on the springs of the governor 33×× to fly outwardly and remove the disk 123 from contact with the hub of the pinion 32×, (see Fig. 22,) thus permitting the cylinder 44 to rotate at its full speed and play a tune very rapidly.

When it is desired to slacken the speed of the cylinder 44, the handle 129 (seen in Fig. 21) is rotated, so as to cause the cam 127 to move the rod 125, in the present instance, to the left, and thereby bring the disk 123 in contact with the hub of the pinion 32×, the friction between said disk 123 and hub retarding the speed of the cylinder 44, as is evident. It will be apparent that the speed of the cylinder may be considerably varied, according to the extent of friction between the disk 123 and the hub of the pinion 32×.

When the handle 98 is moved in the direction indicated by the arrow $p$ in Fig. 11, the cam 99 will cause the lever 107 to turn on its pivot 108, and thus throw the key-bar 111 into the position seen in Fig. 2, thus causing the pins 112 of the key-hammers 113 to move out of the path of the pins 114 of the cylinder 44, and during the movement of the handle 98 in the direction just stated the pawl 101 imparts motion to the ratchet 102 and rotates the same in the direction indicated by the arrow $p$ in Fig. 2, thereby causing the step 105, against which abuts the journal 106 of the cylinder 44, as seen in said Fig. 2, to leave the same and cause the step 105 immediately in the rear of the former one to take its place, and thus move the cylinder 44 in a longitudinal direction the distance of one step 105, and thereby bring a new series of pins 114 into action in order to change the tune. The handle 98 is then returned to its normal position, which permits the lever 107 to likewise return to its normal position and cause the key-bar 111 to return into the position seen in Fig. 11, and thus again bring the pins 112 of the key-hammers 113 in the path of certain of the pins 114 of the cylinder 44.

Having thus described my invention, what I claim as new, and desire to secure by Letters Patent, is—

1. In a coin-controlled piano, a drum, connections therefrom to the operative parts of the piano, a brake-shoe adapted to contact with said drum, a spring-actuated device engaging said brake-shoe, means for directing a coin so as to contact with said device, and means for actuating said coin and said device.

2. In a coin-controlled piano, a shaft having a drum mounted thereon, a brake-shoe for said drum, a spring-actuated rod attached to said shoe, said rod having a deflected end, the latter being adapted to be engaged by a coin after the insertion thereof into the piano, and means for actuating said coin and rod.

3. In a coin-controlled street-piano, a drum, means for rotating the latter, connections from said drum to the operative parts of the piano, a brake-shoe adapted to contact with said drum, a spring-actuated rod engaging said shoe, means for directing a coin so as to contact with an end of said rod, and means for actuating said coin, rod and brake-shoe.

4. In a coin-controlled street-piano, a pivoted finger-piece, a coin-chute leading therefrom, a spring-pressed lever, means for rocking said lever in unison with said finger-piece, a plate pivotally supported below said chute and adapted to receive a coin, a link connecting said lever and plate, and means for effecting the operation of the piano by the movement of said plate.

5. In a coin-controlled street-piano, a pivoted finger-piece, a pivoted coin-receiving plate, a lever movable in unison with said finger-piece, a link connecting said lever and plate, a guiding-sleeve carried by said link, a rod passing through said sleeve, guides for said rod, a brake-shoe carried by the latter, a drum adapted to be engaged by said shoe, means for actuating said drum and connections from the latter to the operative parts of the piano.

6. In a coin-controlled street-piano, a pivoted coin-receiving plate, a movable finger-piece, connections common to said plate and finger-piece, whereby the same move in unison, means for effecting the operation of the piano by the movement of said plate, a spring-pressed lever 62 having a connection to said plate, a bar 116 pivotally supported, means for actuating said bar and a lever 118 operated by said bar and adapted to operate said lever 62.

7. In a coin-controlled street-piano, a finger-piece, a pivoted plate movable in unison therewith, a chute discharging from said finger-piece upon said plate, means for effecting the operation of said piano by the movement of said plate, a spring pressed lever 62 connected to said plate, a bar 116 pivotally supported, means for actuating said bar from the cylinder 44, a lever 118 intermediate said bar and lever 62, and an arm 121 secured to the winding device and adapted to engage an end of the lever 62.

8. In a coin-controlled street-piano, a pivoted finger-piece, a pivoted plate, connections common thereto, a sleeve adapted to act as a stripper carried by said connections, a pointed rod passed through and guided in said sleeve, a spring engaging said rod, and means for effecting the operation of the piano by the movement of said rod.

9. In a coin-controlled street-piano, gearing actuating a shaft, a drum carried by said shaft, tension devices for said gearing, a brake-shoe for said drum, an upwardly-extending rod attached to said shoe, a spring for holding said rod and shoe in position, a downwardly-extending member attached to said rod, and provided with a pointed end, said end being adapted to be engaged by a coin after the insertion of the latter, and means for elevating said coin, rod and brake-shoe.

10. In a coin-controlled street-piano, a recessed finger-piece, pivotally supported, a chute for a coin leading therefrom, a spring-pressed lever, means for rocking said lever in unison with said finger-piece, a plate for the reception of a coin, pivotally supported, a link connecting said lever and plate, a housing for the latter, and means for effecting the operation of the piano, by the movement of said plate.

11. In a coin-controlled street-piano, a pivoted coin-receiving plate, a movable finger-piece, connections common to said plate and finger-piece, whereby the same move in unison, a spring-pressed lever 62, having a connection to said plate, a bar 116 pivotally supported, means on the drum or cylinder 44 for actuating said bar and a lever 118 suitably fulcrumed, and operated by said bar, said lever 118 being adapted to operate said lever 62.

12. In a coin-controlled street-piano, a recessed finger-piece, pivotally supported, a pivoted coin-receiving plate, a housing for the latter, a lever actuated in unison with said finger-piece, a link connecting said lever and housing, a sleeve or guiding device carried by said link, a pointed rod passing through said sleeve, guides for said rod, and means carried by said rod for controlling the operation of the piano.

13. In a coin-controlled street-piano, a winding-shaft, an arm 121 attached thereto, a lever 62 pivotally supported, a member 122 pivotally attached to said lever and located in the path of said arm, a coin-receiving plate pivotally supported and connections from said lever to said plate.

14. In a coin-controlled piano, a winding device having an arm attached thereto, a lever 62 having a portion thereof adapted to be actuated by said arm, a lever 118 adapted to engage said lever 62, a bar 116, a cylinder 44, means on said cylinder for actuating said bar, a movable coin-receiving plate, and connections common to said lever 62 and to said plate.

15. In a coin-controlled piano, a movable finger-piece, a coin-chute leading therefrom, a plate pivotally supported below said chute and adapted to receive a coin, connections common to said finger-piece and plate, a reciprocating slide mounted on said plate, a music-cylinder, and connections intermediate said cylinder and slide.

16. In a coin-controlled piano, a movable finger-piece, a coin-chute leading therefrom, a plate pivotally supported below said chute and adapted to receive a coin, connections common to said finger-piece and plate, a reciprocating slide mounted on said plate, a music-cylinder, and connections intermediate said cylinder and slide, in combination with means for effecting the operation of the piano by the movement of said plate.

17. In a coin-controlled piano, a movable finger-piece, a coin-chute leading therefrom, a plate pivotally supported below said chute and adapted to receive a coin, connections common to said finger-piece and plate, a reciprocating slide mounted on said plate, and means for actuating said slide during the winding of the piano.

18. In a coin-controlled piano, a movable finger-piece, a coin-chute leading therefrom, a plate pivotally supported below said chute and adapted to receive a coin, connections common to said finger-piece and plate, a reciprocating slide mounted on said plate, and means for actuating said slide during the winding of the piano, in combination with means for effecting the operation of said piano by the movement of said plate.

19. In a coin-controlled piano, a pivoted finger-piece, a pivoted plate, connections common thereto, a sleeve carried by said connections, a spring-actuated rod passed through and guided in said sleeve, and means for effecting the operation of the piano by the movement of said rod.

20. In a coin-controlled piano, a pivoted finger-piece, a coin-chute leading therefrom, a plate pivotally supported below said chute and adapted to receive a coin, connections common to said finger-piece and plate, a movable slide mounted on said plate, a drum in connection with the operative parts of the piano, a spring-actuated brake-shoe therefor, means for actuating said slide by the winding of the piano, and means for actuating said brake-shoe after the insertion of a coin into said chute.

21. In a coin-controlled piano, a movable finger-piece, a coin-chute leading therefrom, a plate movably supported below said chute and adapted to receive a coin, connections common to said finger-piece and plate, a music-cylinder, a drum, mechanism for actuating said drum and cylinder in unison, a brake-shoe adjacent said drum, connections intermediate said plate and brake-shoe for actuating the latter, a slide mounted on said plate, and means for actuating said slide during the winding of the piano.

22. In a coin-controlled piano, a movable finger-piece, a coin-chute leading therefrom, a plate movably supported below said chute and adapted to receive a coin, connections common to said finger-piece and plate, a music-cylinder, a drum, mechanism for actuating said drum and cylinder in unison, a brake-shoe adjacent said drum, connections intermediate said plate and brake-shoe for actuating the latter, a slide mounted on said plate, and means operated by said cylinder for actuating said slide.

23. In a coin-controlled piano, a movable finger-piece, a coin-chute leading therefrom, a plate movably supported below said chute and adapted to receive a coin, connections common to said finger-piece and plate, a music-cylinder, a drum, mechanism for actuating said drum and cylinder in unison, a brake-shoe adjacent said drum, connections intermediate said plate and brake-shoe for actuating the latter, a slide mounted on said plate, means for actuating said slide by the winding of the piano, and means operated by said cylinder for actuating said slide.

ALESSANDRO CAPRA.

Witnesses:
JOHN A. WIEDERSHEIM,
H. LeGRAND ENSIGN.